US010009586B2

(12) United States Patent
Mutter et al.

(10) Patent No.: US 10,009,586 B2
(45) Date of Patent: Jun. 26, 2018

(54) SYSTEM AND METHOD FOR PROJECTING IMAGES ON A MARKED SURFACE

(71) Applicant: CHRISTIE DIGITAL SYSTEMS USA, INC., Cypress, CA (US)

(72) Inventors: Curtis Gordon Mutter, Baden (CA); Ian Chadwyck Faragher, Kitchener (CA); Daniel Thomson Urquhart, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days. days.

(21) Appl. No.: 15/459,617

(22) Filed: Mar. 15, 2017

(65) Prior Publication Data

US 2018/0139425 A1    May 17, 2018

Related U.S. Application Data

(60) Provisional application No. 62/420,747, filed on Nov. 11, 2016.

(51) Int. Cl.
*H04N 3/22* (2006.01)
*H04N 9/31* (2006.01)
(Continued)

(52) U.S. Cl.
CPC ....... *H04N 9/3185* (2013.01); *G06F 3/03543* (2013.01); *G06T 3/0093* (2013.01)

(58) Field of Classification Search
CPC .. H04N 9/3185; G06F 3/03543; G06R 3/0093
(Continued)

(56) References Cited

U.S. PATENT DOCUMENTS 6,056,408 A * 5/2000 Kobayashi ............. G03B 21/14
348/745
8,912,977 B2 12/2014 Yanagita et al.
(Continued)

FOREIGN PATENT DOCUMENTS

WO    2007083214 A2    7/2007
WO    2014000159 A1    3/2014

OTHER PUBLICATIONS

Green, M. et al.: "A New Computer-Human Interface for Aligning and Edge-Matching Multichannel Projector Systems", International Symposium of the SID, Anaheim, May 24-26, 1988; Playa Del Rey, vol. 19, No. 1988, May 24, 1988, pp. 109-112.
(Continued)

*Primary Examiner* — Michael Lee
(74) *Attorney, Agent, or Firm* — Perry + Currier, Inc.

(57) ABSTRACT

A system, method and computer readable medium for projecting images on a marked surface. The system includes a memory storage unit, a projector, a camera, an input device for receiving input data to align correspondence points in a template image with features on a marked surface, a computing device for calculating a correction model, and a rendering device for generating image data. The method involves projecting a template image to generate a camera image, receiving input data, calculating a correction model based on the input data and generating and projecting image data. The computer readable medium is encoded with codes to direct a processor to carry out the method.

20 Claims, 5 Drawing Sheets

(51) Int. Cl.
*G06F 3/0354* (2013.01)
*G06T 3/00* (2006.01)

(58) Field of Classification Search
USPC ............................................. 348/745
See application file for complete search history.

(56) References Cited

U.S. PATENT DOCUMENTS

| | | |
|---|---|---|
| 2004/0036771 A1 | 2/2004 | Sayers et al. |
| 2004/0201824 A1* | 10/2004 | Wada .................. H04N 5/7416 353/69 |
| 2007/0291184 A1 | 12/2007 | Harville et al. |
| 2008/0137038 A1 | 6/2008 | Winstanley |
| 2010/0277655 A1* | 11/2010 | Sun .......................... H04N 9/12 348/744 |
| 2012/0154695 A1* | 6/2012 | Laduke .................. G03B 21/14 348/745 |
| 2012/0212627 A1 | 8/2012 | Klose |
| 2012/0280948 A1 | 11/2012 | Barrus et al. |
| 2013/0215132 A1* | 8/2013 | Fong ....................... G06F 3/011 345/582 |
| 2014/0111857 A1 | 4/2014 | Roh et al. |
| 2014/0225915 A1* | 8/2014 | Theimer .............. G02B 27/017 345/633 |
| 2014/0300632 A1* | 10/2014 | Laor ..................... G06T 19/006 345/633 |
| 2016/0037144 A1 | 2/2016 | Schultz et al. |
| 2016/0045276 A1* | 2/2016 | Pfanner .................. A61B 19/02 235/385 |

OTHER PUBLICATIONS

EPO, Extended European Search Report, dated Apr. 11, 2018, re European Patent Application No. 17171167.4.
Christie: "Christie and Solotech Score with On-Ice Projection Mapping Display at Air Canada Centre in Toronto", Mar. 10, 2016, https://www.christiedigital.com/en-us/about-christie/news-room/press-releases/christie-scores-with-on-ice-projection-mapping-display.

* cited by examiner

SYSTEM AND METHOD FOR PROJECTING IMAGES ON A MARKED SURFACE

FIELD

The specification relates generally to projectors, and specifically to a system and method for calibrating a camera-projector system for projecting images on a marked surface such that the image content aligns with markings on the surface.

BACKGROUND

Projection systems are known for rendering images for projection onto a surface such as a screen. When projecting onto a projection surface that has markings on it, feedback loops can be used to align images with the markings. For example, systems using calibration patterns that are visible or invisible are known for aligning multiple projectors or for autofocusing projectors. In general, these systems use an algorithm that performs an iterative process.

Projecting content onto non-traditional screens is also known. For example, there are systems for projecting images onto the ground or the floor of a building. In general, such systems merely use the other surface as a screen and require a uniform surface onto which the content is to be projected.

SUMMARY

In accordance with an aspect of the invention, there is provided a system for projecting images on a marked surface. The system includes a memory storage unit for storing a template database. The template database includes a template image associated with the marked surface. The template image includes a plurality of correspondence points representing a plurality of features on the marked surface. The system further includes a projector configured to project the template image onto the marked surface. In addition, the system includes a camera for generating a camera image based on the template image projected onto the marked surface. Furthermore, the system includes an input device for receiving input data, the input data configured to align the plurality of correspondence points with the plurality of features on the marked surface in the camera image. In addition, the system includes a computing device for calculating a correction model based on the input data, wherein the correction model is configured to generate pose data based on object data. The system also includes a rendering device for generating image data based on the pose data using the correction model, wherein the image data is sent to the projector for projecting on the marked surface.

The marked surface may be a flat marked surface.

The flat marked surface may be a playing surface of a sports arena and the plurality of features may be plurality of markings.

The template image may include model markings of the playing surface.

The input device may be a mouse.

The mouse may be configured to align the plurality of correspondence points with the plurality of features on the marked surface in the camera image using drag and drop functionality.

The system may further include an image recognition engine configured to recognize the plurality of features on the marked surface in the camera image.

The input data may be automatically generated based on the plurality of features on the marked surface in the camera image recognized by the image recognition engine.

The input data may be further configured to warp the template image.

In accordance with another aspect of the invention, there is provided a method of projecting images on a marked surface. The method involves projecting a template image onto the marked surface with a projector, wherein the template image is selected from a template database stored on a memory storage unit. The method further involves generating a camera image from a camera. The camera image is based on the template image projected onto the marked surface, wherein the template image includes a plurality of correspondence points representing a plurality of features on the marked surface. Furthermore, the method involves receiving input data via an input device. The input data is configured to align the plurality of correspondence points with the plurality of features on the marked surface in the camera image. In addition, the method involves calculating, using a computing device, a correction model based on the input data, wherein the correction model is configured to generate pose data based on object data. The method also involves generating image data based on the pose data using a rendering device to apply the correction model. Furthermore, the method involves projecting the image data on the marked surface using the projector.

The surface may be a flat surface.

The flat surface may be a playing surface of a sports arena and the plurality of features are plurality of markings.

The template image may include model markings of the playing surface.

Receiving input data may involve receiving data from a mouse.

The method may involve aligning the plurality of correspondence points with the plurality of features on the surface in the camera image using drag and drop functionality.

The method may involve recognizing, using an image recognition engine, the plurality of features on the surface in the camera image.

The method may involve automatically generating the input data based on the plurality of features on the surface in the camera image recognized by the image recognition engine.

The method may involve warping the template image using the input data.

In accordance with another aspect of the invention, there is provided a non-transitory computer readable medium encoded with codes. The codes direct a processor to project a template image onto the marked surface with a projector, wherein the template image is selected from a template database stored on a memory storage unit. Furthermore, the codes direct a processor to generate a camera image from a camera, the camera image based on the template image projected onto the marked surface, wherein the template image includes a plurality of correspondence points representing a plurality of features on the marked surface. In addition, the codes direct a processor to receive input data via an input device. The input data is configured to align the plurality of correspondence points with the plurality of features on the marked surface in the camera image. Also, the codes direct a processor to calculate a correction model based on the input data, wherein the correction model is configured to generate pose data based on object data. The codes also direct a processor to generate image data based on the pose data using a rendering device to apply the correction model. The codes further direct a processor to project the image data on the marked surface using the projector.

The input device may be configured to align the plurality of correspondence points with the plurality of features on the marked surface in the camera image using drag and drop functionality.

BRIEF DESCRIPTION OF THE DRAWINGS

Reference will now be made, by way of example only, to the accompanying drawings in which.

DETAILED DESCRIPTION OF THE EMBODIMENTS

In general, this disclosure sets forth a solution to the problem discussed forth above in the form of a system and method for calibrating the projector(s) of a camera-projector calibration system so that the content aligns with markings on the projection surface.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Figure 1:
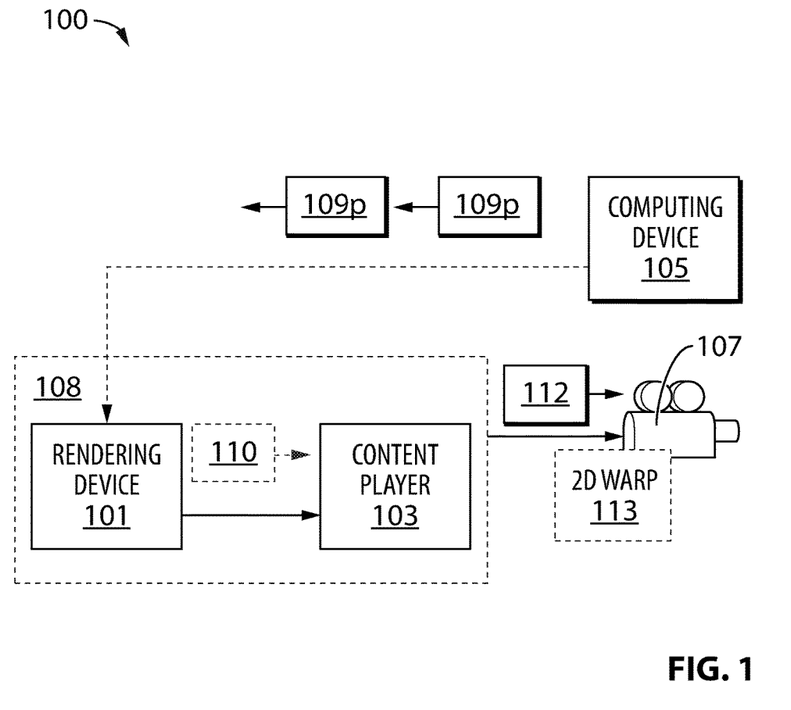
FIG. 1 is a schematic drawing of a system in accordance with an embodiment.

FIG. 1 depicts a system 100 comprising: a rendering device 101 (interchangeably referred to hereafter as device 101); a content player 103; a computing device 105; and a projector 107. In general, device 101 is in communication with content player 103 and optionally computing device 105, and content player 103 is in communication with projector 107. Projector 107 includes a non-planar lens including, but not limited to, a fisheye lens, an f-theta lens and the like.

As depicted, device 101 and content player 103 can be combined into one device 108 (which can also be referred to as a rendering device), however in other implementations device 101 and content player 103 can be separate devices. Computing device 105 is configured to generate pose data 109p comprising extrinsic parameters and intrinsic parameters of projector 107, as described in further detail below. Device 101 can generate rendered data 110 from pose data 109p, for example by rendering existing data (not depicted) for projection by projector 107. In FIG. 1, solid lines connecting components show flow of image and/or video data there between, while the stippled line connecting computing device 105 to device 101 and/or device 108 shows flow of pose data 109p and object data 109o there between. Object data 109o generally comprises content of a location and orientation of an object onto which images from projector 107 are projected, and can be determined by computing device 105 using one or more cameras, as discussed below.

When device 101 and content player 103 are separate, device 101 communicates data 110 to content player 103, which processes and/or "plays" data 110 by producing projection image data 112 suitable for processing and projection by projector 107. For example, rendered data 110 can include, but is not limited to, an AVI file, a series of JPG files, a PNG file, and the like. Projection image data 112 can include, but is not limited to, HDMI data, VGA data, and/or video transport data. When device 101 and content player 103 are combined in device 108, device 108 can render projection image data 112 (e.g. video data) in real-time without producing rendered data 110. In any event, projection image data 112 is communicated to projector 107 by content player 103 where projection image data 112 is used to control projector 107 to project images based thereupon, for example onto a surface with features such as markings. The features can include markings such as those typically found on a playing surface of a sport arena or sports field to mark the playing surface. For example, the surface can be a basketball court where the features can include the painted lines marking the court boundaries, key, center, etc.; or the surface can be a hockey rink where the features can include the painted lines marking the faceoff circles, goalie crease, hash marks, etc. Other examples of surfaces with markings can include a table-top game board, such as table tennis, or poker table, or can be a turf-based sports field such as an American football field, rugby field, or soccer field.

Device 101 generally comprises an image generator and/or renderer, for example a computing device, a server and the like, configured to generate and/or render images as rendered data 110. Such rendered data 110 can include, but is not limited to, still images, video and the like. Furthermore, while not depicted, device 101 can be in communication with, and/or comprise, an image generator and/or a memory storage unit from which rendered data 110 can be generated and/or rendered. Alternatively, device 101 can generate rendered data 110 using algorithms, and the like.

Content player 103 comprises a player configured to "play" and/or render data 110 for the specific projector 107; for example, when rendered data 110 comprises video data, content player 103 is configured to play and/or render the video data by outputting projection image data 112 for projection by projector 107. Hence, content player 103 can include, but is not limited to a video player, a video processing device, a computing device, a server, and the like. However, as described above, when device 101 and content player 103 are combined as device 108, rendering of rendered data 110 can be eliminated and device 108 renders projection image data 112 without producing the intermediary rendered data 110.

Computing device 105 comprises any suitable computing device configured to be one or more of: automatically determine pose data 109p of projector 107; and automatically determine object data 109o.

Projector 107 comprises a projector configured to project projection image data 112, including but not limited to a digital projector, a cinema projector, an LCOS (Liquid Crystal on Silicon) based projector, a DMD (digital multi-mirror device) based projector and the like. Furthermore, while only one projector 107 is depicted, system 100 can comprise a plurality of projectors 107, each configured to project respective image data comprising, for example, portions of larger tiled image to be projected. Regardless of a technology used in projector 107, it is assumed that projector 107, and/or other projectors described herein, includes an image modulator that includes a plurality of individual pixel modulators; for example, when a projector comprises a DMD projector, the image modulator comprises a plurality of digital micromirrors, with one micromirror for each pixel of an image to be projected.

As depicted system 100 further comprises one or more optional 2D ("two-dimensional") warping devices and/or modules 113, for example at projector 107 (though such a warping device can be present at content player and/or as a stand-alone device) When present, projection image data 112 can be warped by warping module 113, for example by moving and/or adjusting pixels within projection image data 112, to adjust projection image data 112 for projection by projector 107 onto a marked surface to account for changes to the markings (e.g. re-painting of lines on a hockey rink). However, as computing device 105 determines pose data 109$p$ and communicates such to device 101 (and/or device 108), warping module 113 can be unused, optional and/or eliminated from system 100. Indeed, use of warping module 113 represents how images were processed according to the prior art and the presence of warping module 113 is obviated by virtue of computing device 105 providing device 101 (and/or device 108) with pose data 109$p$ by applying a correction model, which can also accommodate correcting mismatched aspect ratios. However, in some implementations, warping module 113 can be used to make small changes to projection of images onto a physical surface, for example when a virtual model of the surface markings used to produce the images does not precisely match the physical surface markings.

While each of device 101, content player 103, computing device 105, and projector 107 are depicted as distinct components, in other implementations, respective portions of one or more of device 101, content player 103, computing device 105, and projector 107 and can be implemented within the same device (e.g. device 108) and/or processing resources can be shared there between. For example, while not depicted, system 100 comprises one or more controllers, one or more processors, one or more memories and one or more communication interfaces, for example a controller, memory and communication interface for each of device 101, content player 103, computing device 105, and projector 107 and/or to be shared among device 101, content player 103, computing device 105, and projector 107. Indeed, in general, components of system 100, as depicted, represent different functionality of a projection system where: pose data 109$p$ of projector 107 can be automatically determined. In some implementations, system 100 includes components and/or functionality for updating pose data 109$p$ when projector 107 moves, and/or the surface onto which images are being projected, moves.

Figure 2:
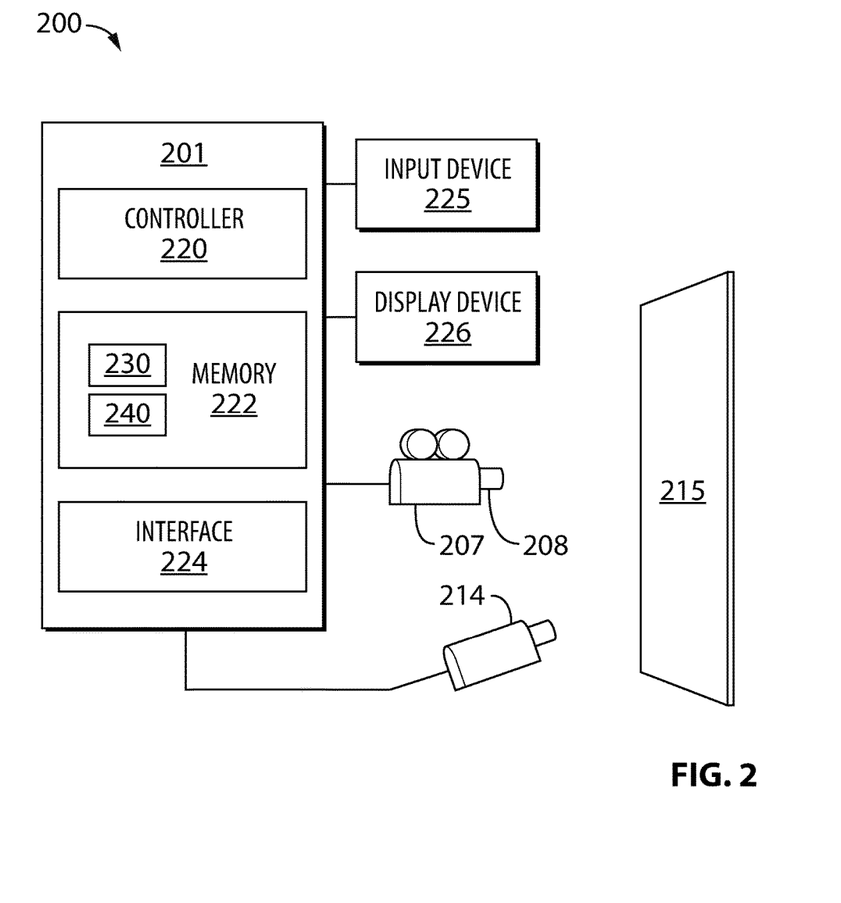
FIG. 2 is a schematic drawing of a system in accordance with another embodiment.

Attention is next directed to FIG. 2 which depicts a system 200 for calibrating a camera-projector system for projecting images on a marked surface such that the image content aligns with markings on the surface. In some embodiments, it is contemplated that computing device 105 can include one or more components of system 200, and furthermore components of system 100 can comprise components of system 200 as desired. System 200 comprises a computing device 201 (interchangeably referred to hereafter as device 201), at least one projector 207, each comprising a lens 208; camera 214; and marked surface 215 onto which images from projector 207 are to be projected. Indeed, it is assumed that projector 207 is mounted relative to surface 215 such that images from projector 207 are projected onto at least a portion of the surface 215. Further, it is assumed that camera 214 can be used to determine geometry of the surface 215.

In general, projector 107 can comprise projector 207, computing device 105 can comprise computing device 201, projector 207 and camera 214, and any of device 101 and content player 103 can comprise at least a portion of computing device 201, for example when resources are shared amongst device 101, content player 103 and computing device 105. Furthermore, while only one projector 207 is depicted, system 200 can comprise more than one projector.

In the present embodiment, the projector 207 is configured to project images onto the surface 215. It is to be appreciated that the images projected onto the surface 215 are not particularly limited. For example, the projector 207 can project a template image discussed in further detail below, or project an image based on image data from a content player.

Camera 214 is connected to the computing device 201 and generally configured to generate camera image data based on a recorded image. In the present embodiment, the camera 214 is configured to record images from the surface 215. For example, when the projector 207 projects a template image onto the surface 215, the camera 214 is configured to generate a camera image based on the template image projected onto the marked surface 215. In other embodiments, the camera 214 can record a raw image of the marked surface (i.e. without a projected template image) for subsequent superimposition of a template image onto the raw image using various image manipulation tools. It is to be appreciated that in embodiments where the template image is superimposed, overlaying the template image on the marked surface 215 using the projector 207 may not be necessary for efficiency.

Device 201 can comprise any suitable computing device, including but not limited to a graphics processing unit (GPU), a graphics processing device, a graphics processing engine, a video processing device, a personal computer (PC), a server, and the like, and generally comprises a controller 220, a memory storage unit 222, a communication interface 224 (interchangeably referred to hereafter as interface 224) and at least one input device 225 and display device 226.

Interface 224 comprises any suitable wired or wireless communication interface configured to communicate with projector 207 and camera 214 (and any of device 101, content player 103, computing device 105, and device 108) in a wired and/or wireless manner as desired.

Controller 220 can comprise a processor and/or a plurality of processors, including but not limited to one or more central processors (CPUs) and/or one or more processing units; either way, controller 220 comprises a hardware element and/or a hardware processor. Indeed, in some implementations, controller 220 can comprise an ASIC (application-specific integrated circuit) and/or an FPGA (field-programmable gate array) specifically configured to determine at least pose data of a projector, for example projector 207. Hence, device 201 is preferably not a generic computing device, but a device specifically configured to implement specific pose data determination functionality. For example, device 201 and/or controller 220 can specifically comprise a computer executable engine configured to implement specific pose data determination functionality.

Memory storage unit 222 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 201 as described herein are typically maintained, persistently, in memory storage unit 222 and used by controller 220 which makes appropriate utilization of volatile storage during the execution of such programming instructions. Those skilled in the art recognize that memory storage unit 222 is an example of computer readable media that can store programming instructions executable on controller 220. Furthermore, memory storage unit 222 is also an example of a memory unit and/or memory module and/or a non-volatile memory.

In particular, memory storage unit 222 stores an application 230 and template images (also referred to as models) in a template database 240 where a template image can be associated with a projection surface 215. The selection of the template image from the template database 240 can be determined using camera 214 and projector 207 and/or another projector (not depicted), or manually from a list by a user. In other implementations, template database 240 can be provisioned at memory storage unit 222 using, for example, a template image supplied specifically for the surface 215.

The template image includes a plurality of correspondence points representing a plurality of features on the marked surface 215 based on an ideal image of the playing surface such as one developed from a rulebook, or a blueprint of the surface design. In the present embodiment of a hockey rink template image, the correspondence points represent an intersection of the faceoff circles with a hash mark. It is to be appreciated that the correspondence points are not particularly limited, and can correspond to another feature, such as the center of the faceoff circle or edge of the rink. It is to be appreciated by a person of skill in the art with the benefit of this description that the correspondence points can be assigned based on other known features that are easily identifiable. Assigning correspondence points closer to the edge of the template image can also provide better results for the correction model. In the present embodiment, four pre-determined correspondence points are use; however, it is to be appreciated by a person of skill in the art with the benefit of this description that more correspondence points can provide for an improved correction model. Furthermore, although the present example illustrates correspondence points that are pre-determined, the correspondence points can be customized by a user.

In the present embodiment, the input device 225 is generally configured to receive input data to define a homography, on which the correction model is to be based. In particular, the input device 225 can receive input data for aligning a plurality of correspondence points of the template image with the features of the surface 215. The homography can then be used to align plurality of correspondence points of the template image with the features of the surface 215 by warping, scaling or translating the template image.

As an example, the application 230 when processed by controller 220, enables controller 220 and/or computing device 201 to: using input device 225 and display device 226, add selected correspondence points to the template database 240 and specify the location of matching features in an image taken by camera 214 when the template image is projected onto surface 215 (wherein the matched feature points and correspondence points define a homography between the template image and camera image of the surface 215); superimpose the template image over the camera image with the homography applied; and generate pose data 109p for controlling projector 207 to project images onto the surface 215. Accordingly, computing device 201 and/or controller 220 is generally configured to determine pose data 109p of projector 207.

It is to be appreciated by a person of skill in the art with the benefit of this description that the manner by which the correspondence points are aligned is not particularly limited. For example, the camera image of the surface 215 (including the template image superimposed on the marked surface) can be displayed on the display device 226 where a user can enter input data for aligning the correspondence points. For example, the input device 225 can be a keyboard configured to received commands for aligning the correspondence points. As another example, the input device 225 can be a mouse configured to align the correspondence points with the features of the surface 215 using drag and drop functionality when displayed on the display device 226.

In further embodiments, the input data can be generated by the input device 225 using an optional image recognition engine configured to recognize a plurality of features in the camera image captured and generated by the camera 214. The manner by which the image recognition engine recognizes features in an image is not particularly limit and can include various optical recognition methods that are capable of identifying the feature in an image. Once the plurality of features associated with the correspondence points in the template image are identified in the camera image by the image recognition engine, input data can be automatically generated to align the feature points with the correspondence points.

The computing device 201 subsequently uses the input data received from the input device 225 to calculate the correction model. The correction model can be subsequently used to generate pose data 109p based on object data 109o such that the pose data 109p is mapped to the markings on the surface 215. In the present embodiment, object data 109o can be any data representing content. For example, the object data 109o can be data representing advertisements intend to be displayed within certain features of the surface 215. For example, an advertiser may wish to utilize the markings on the surface 215 as part of the marketing content. As another example, the object data 109o can represent an image or video, such as a replay of a sporting event played on the surface 215. It is to be appreciated that the object data 109o can also be the template image and that the pose data 109p can be the template image mapped to the surface 215 used to confirm that the homography is correctly defined.

As discussed above, a surface such as a hockey rink can be used for projecting an image. When the surface includes markings, the content imagery should align, when projected, with the markings on the surface. The markings can be any visible features (e.g. the lines on a hockey rink or basketball court, golf course, or a table-top game board).

Figure 3:
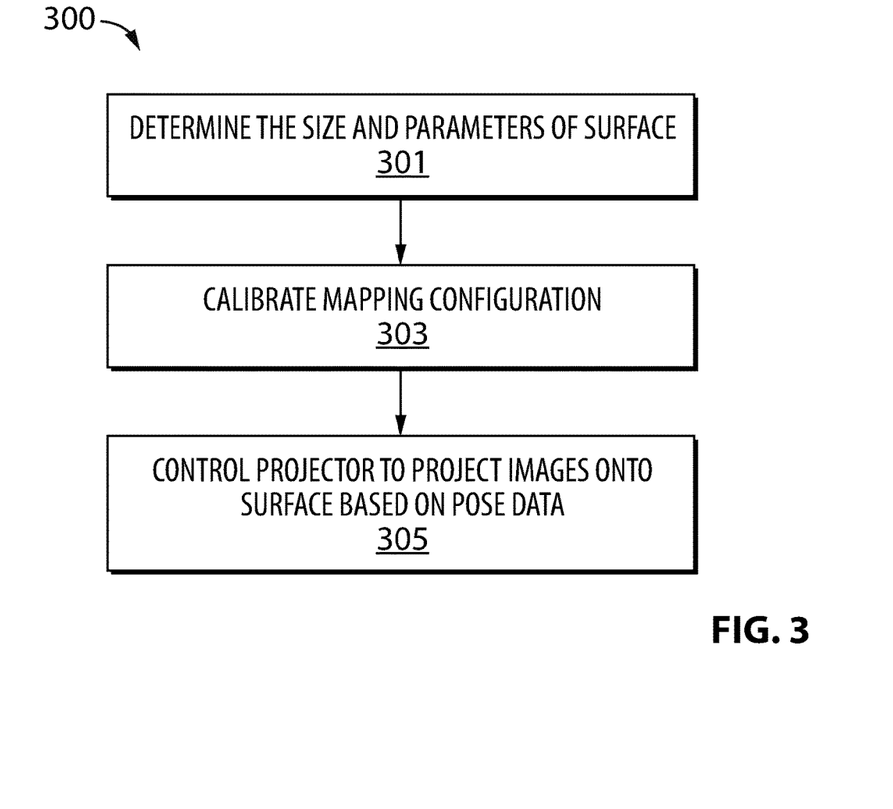
FIG. 3 is flow chart of a method in accordance with an embodiment.

The method of FIG. 3, which depicts a flowchart according to a non-limiting embodiment, can be used to provide camera-projector calibration of the projector 207 so that the image content aligns with markings on the surface 215.

Figure 4A:
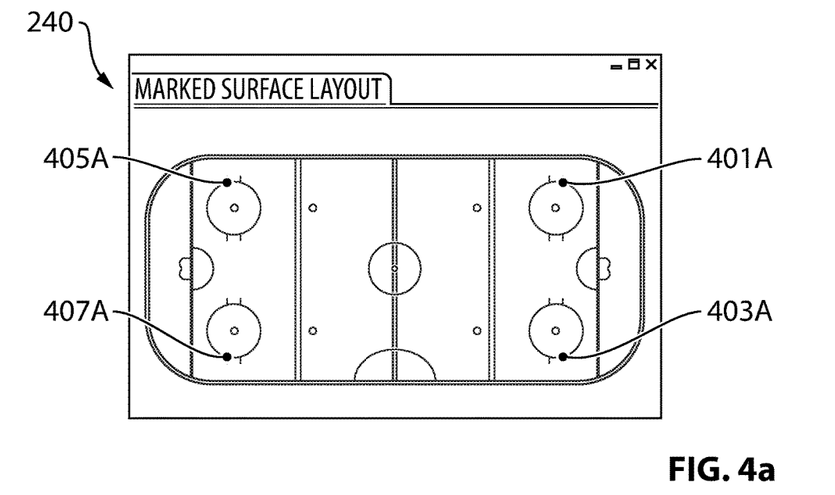
FIG. 4a is a screenshot display on a display device in accordance with an embodiment showing a template image.

In order to map content correctly onto surface 215, the system 200 must know where the surface 215 is located in the image of camera 214. FIG. 4a is a screenshot of an exemplary user interface rendered on display device 226 for providing camera overlay feedback for calibrating the camera-projector system of FIG. 2 on a marked surface (i.e. a hockey rink), according to the method of FIG. 3. In order to assist in the explanation of method 300, it will be assumed that method 300 is performed using system 200, and specifically by controller 220 of device 201, for example when controller 220 processes application 230. Indeed, method 300 is one way in which system 200 and/or device 201 can be configured. Furthermore, the following discussion of method 300 will lead to a further understanding of device 201, and system 200 and its various components. However, it is to be understood that system 200 and/or device 201 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 200 as well. Furthermore, while computing device 201 is described as implementing and/or performing each block of method 300, it is appreciated that each block of method 300 occurs using controller 220 processing application 230.

Figure 4B:
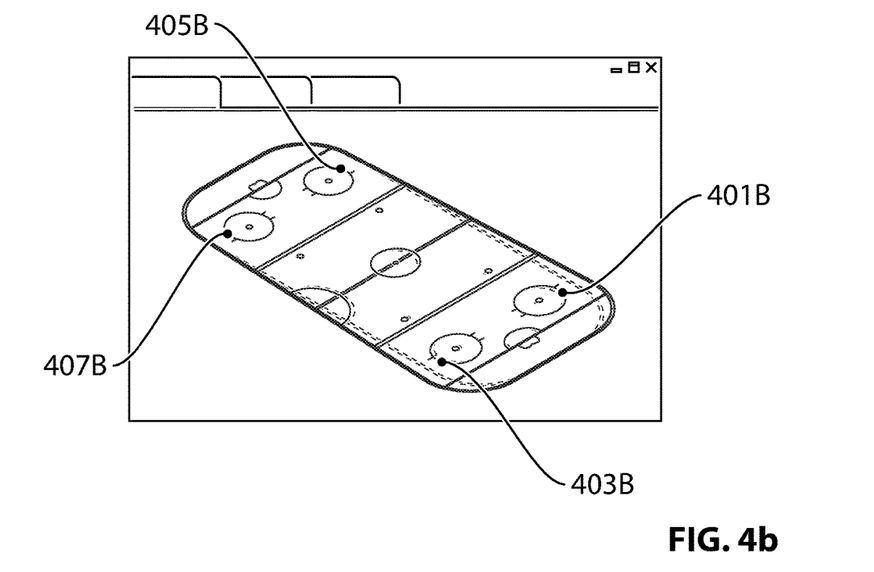
FIG. 4b is a screenshot display on a display device in accordance with an embodiment showing a template image projected onto the marked surface.

At block 301, controller 220, determines the size and parameters of the surface 215. In one embodiment, a template image (e.g. a Portable Network Graphics [png] file) is obtained by, for example, browsing for and opening a file from the template database 240 shown on the display device 226. The template image is selected from the template database 240 to have the same dimensions as the markings on the surface 215. In some instances, the template image can be the same design that is used to create the markings on the physical surface 215. As shown in the exemplary embodiment of FIG. 4a, the correspondence points are four feature markers 401A, 403A, 405A and 407A that appear near the corners of the image, which form a dataset of a point-to-point correspondence between the template image and the camera image. Another dataset is formed by specifying the location of features 401B, 403B, 405B and 407B on the marked surface 215 corresponding to the feature markers 401A, 403A, 405A and 407A in the camera image depicted in FIG. 4b.

Each correspondence point has a position in a template image, which corresponds with a position of a feature in the camera image. These eight points define a homography between the template image and the camera image. Although the present embodiment shows the content is planar (flat) and that the camera be calibrated (no distortion), it is to be appreciated that the content can be projected on a screen that is contoured.

At step 303, the controller 220 calculates the correction model by superimposing the template image over the camera image with the eight-point homography applied. In one embodiment (manual calibration), the user can fine-tune the placement of the feature markers 401A, 403A, 405A and 407A relative to the features 401B, 403B, 405B and 407B in the camera image (FIG. 4b) until the user is satisfied with the alignment of the two images. For example, a user can click a "Calibration" menu item, which results in display of the camera image with a transparent overlay of the mapped template image. While in the camera view (FIG. 4b) the user can zoom out until the correspondence points 401B, 403B, 405B and 407B become visible. The points can then be adjusted so that the transparent overlay matches the camera image of the surface 215. In order to make adjustments to the correspondence points, the user can, in one embodiment, hold down the CTRL key of input device 225 and move the correspondence points as required. In some embodiments, it is contemplated that contrast enhancement or image differencing can be employed to assist with visual feedback of the quality of the alignment. For example, values may be configured to change colour from, for example, red to green, when the corner points are exactly calibrated.

Figure 5:
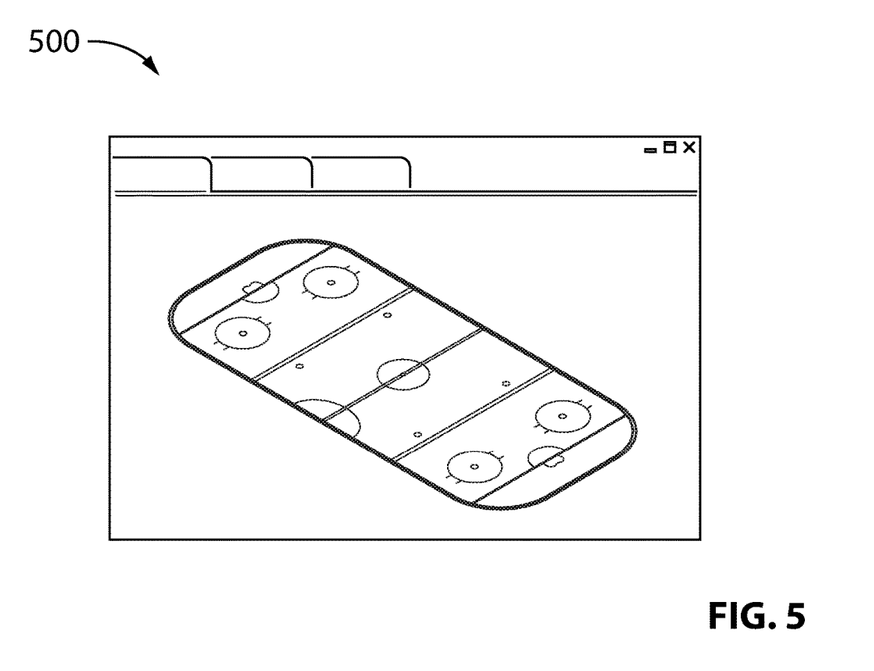
FIG. 5 is a screenshot display on a display device in accordance with an embodiment showing a template image projected onto the marked surface after calibration.

Once the superimposed images are aligned, as shown in FIG. 5, that is the homography (i.e. the pose data 109p) between the camera 214 and the world is known (wherein the layout space serves as the world space in which the surface 215 is defined), traditional camera-projector calibration can be performed with any number of projectors according to step 305. For example, it can be appreciated by a person of skill in the art that the system 200 or the system 100 (assuming a correction model is obtained based on the relative position of the camera 108 and the surface) can be used to provide well-calibrated images for projection on a marked surface.

According to a second embodiment, the controller 220 can perform automatic image-based re-alignment of camera calibration points at step 303. For example, camera-world calibration may become compromised any time the camera 214 or the target projection surface 215 (or the markings upon it) are moved relative to each other. This can happen due to bumping the camera, or by reassembly of the projection surface (e.g.: re-painting the lines on a hockey rink or replacing the surface of basketball court, or by bumping a game-board on a table).

Therefore, once calibration has been completed at step 303, a master camera image may be taken of the camera image of the view in FIG. 4a and saved for use in the computation of future re-alignments.

When such automatic re-calibration is to be performed, a new image is taken from the camera 214. The new image and the saved image will usually differ by the amount that the camera 214 has been bumped, or the amount that the marked surface 215 has changed (moved). Therefore, according to the second embodiment features in the two images are automatically identified and any calibration points are then adjusted by the identical local displacement. More particularly, the identified features are paired so that there are many correspondences identified. Each correspondence has a position in the saved image and a position in the current new image.

The local displacement of any point in the image is then computed (either using a homography or other suitable method) to generate a displacement map by which the correspondence point positions specified in the saved image can be mapped to correspondence point positions in the new image. This results in an up-to-date correspondence between a template image and the new (current) camera image. As discussed above with reference to FIG. 3, a homography is computed to determine the camera-world calibration, following which projector calibration can be performed.

In the embodiments discussed above, four correspondences (i.e. correspondences between 401A/401B, 403A/403B, 405A/405B and 407A/407B) completely define the homography between a surface 215 in the world and the image of it in the camera image. If the markings on the surface are not consistent (e.g., inaccuracies with re-painting lines on the hockey rink) and tight alignment between art content and physical surface is desired, then some extra flexibility can be introduced in such scenarios where the physical world does not match all the dimensions of the content. Such mismatch may not necessarily be limited to aspect ratio, but may also be mismatched internally so that non-homography warping may be necessary to map the content to the marked projection surface.

Therefore, according to a third embodiment, multiple (i.e. more than four) correspondences may be defined. The user may select multiple correspondence points in a template image selected from the template databse 240 and assign all of these correspondences points in the camera image. This results in over-specifying the homography such that the four key correspondences (401A/401B, 403A/403B, 405A/405B and 407A/407B) define the general homography while the additional correspondences define a warped mapping within that plane (i.e. the layout is not a uniform orthonormal grid, but instead is a set of correspondence points).

Traditional techniques can be used to map points of the screen to points in layout space according to the afore-noted warped mapping using, for example, warping devices and/or modules 113 shown in FIG. 1. Known calibration methods can then be used to calibrate the projectors to the camera (provided the warp is not so severe that it exceeds projector warping limitations).

Those skilled in the art will appreciate that in some implementations, the functionality of devices 101, 105, 108, 201, and content player 103 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 105, 108, 201, and content player 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto. As an example of a variation, the system 100 can either receive a correction model for a specific location such that the calibration process is not required. Alternatively, a camera system (not shown) can be connected with the system 100 for only the calibration process such that the camera system is not necessary during normal operation.

While specific embodiments have been described and illustrated, such embodiments should be considered illustrative only and should not serve to limit the accompanying claims.

What is claimed is:

1. A system for projecting images on a marked surface, the system comprising:
   a memory storage unit for storing a template database, wherein the template database includes a template image associated with the marked surface, the template image including a plurality of correspondence points representing a plurality of features on the marked surface;
   a projector configured to project the template image onto the marked surface;
   a camera for generating a camera image based on the template image projected onto the marked surface;
   an input device for receiving input data, the input data configured to align the plurality of correspondence points with the plurality of features on the marked surface in the camera image;
   a computing device for calculating a correction model based on the input data, wherein the correction model is configured to generate pose data automatically based on object data, the object data including received content for projecting on a portion of the marked surface; and
   a rendering device for generating image data based on the pose data using the correction model, wherein the image data is sent to the projector for projecting the received content associated with the object data onto the portion of the marked surface.

2. The system of claim 1, wherein the marked surface is a flat marked surface.

3. The system of claim 2, wherein the flat marked surface is a playing surface of a sports arena and the plurality of features are plurality of markings.

4. The system of claim 3, wherein the template image includes model markings of the playing surface.

5. The system of claim 1, wherein the input device is a mouse.

6. The system of claim 5, wherein the mouse is configured to align the plurality of correspondence points with the plurality of features on the marked surface in the camera image using drag and drop functionality.

7. The system of claim 1, further comprising an image recognition engine configured to recognize the plurality of features on the marked surface in the camera image.

8. The system of claim 7, wherein the input data is automatically generated based on the plurality of features on the marked surface in the camera image recognized by the image recognition engine.

9. The system of claim 1, wherein the input data is further configured to warp the template image.

10. A method of projecting images on a marked surface, the method comprising:
    projecting a template image onto the marked surface with a projector, wherein the template image is selected from a template database stored on a memory storage unit;
    generating a camera image from a camera, the camera image based on the template image projected onto the marked surface, wherein the template image includes a plurality of correspondence points representing a plurality of features on the marked surface;
    receiving input data via an input device, the input data configured to align the plurality of correspondence points with the plurality of features on the marked surface in the camera image;
    calculating, using a computing device, a correction model based on the input data, wherein the correction model is configured to generate pose data automatically based on object data, the object data including received content for projecting on a portion of the marked surface;
    generating image data based on the pose data using a rendering device to apply the correction model; and projecting the received content associated with the object data and represented by the image data onto the portion of the marked surface using the projector.

11. The method of claim 10, wherein the surface is a flat surface.

12. The method of claim 11, wherein the flat surface is a playing surface of a sports arena and the plurality of features are plurality of markings.

13. The method of claim 12, wherein the template image includes model markings of the playing surface.

14. The method of claim 10, wherein receiving input data comprises receiving data from a mouse.

15. The method of claim 14, further comprising aligning the plurality of correspondence points with the plurality of features on the surface in the camera image using drag and drop functionality.

16. The method of claim 10, further comprising recognizing, using an image recognition engine, the plurality of features on the surface in the camera image.

17. The method of claim 16, further comprising automatically generating the input data based on the plurality of features on the surface in the camera image recognized by the image recognition engine.

18. The method of claim 10, further comprising warping the template image using the input data.

19. A non-transitory computer readable medium encoded with codes, the codes for directing a processor to:

project a template image onto a marked surface with a projector, wherein the template image is selected from a template database stored on a memory storage unit;

generate a camera image from a camera, the camera image based on the template image projected onto the marked surface, wherein the template image includes a plurality of correspondence points representing a plurality of features on the marked surface;

receive input data via an input device, the input data configured to align the plurality of correspondence points with the plurality of features on the marked surface in the camera image;

calculate a correction model based on the input data, wherein the correction model is configured to generate pose data automatically based on object data, the object data including received content for projecting on a portion of the marked surface;

generate image data based on the pose data using a rendering device to apply the correction model; and project the received content associated with the object data and represented by the image data onto the portion of the marked surface using the projector.

20. The non-transitory computer readable medium system of claim 19, wherein the input device is configured to align the plurality of correspondence points with the plurality of features on the marked surface in the camera image using drag and drop functionality.

* * * * *